(12) United States Patent
Aguero et al.

(10) Patent No.: US 8,181,269 B2
(45) Date of Patent: May 22, 2012

(54) NIGHT VISION GOGGLE MOUNT WITH RETRACTABLE STOPS

(75) Inventors: Raymond Aguero, Roanoke, VA (US); Todd Michael Neff, Salem, VA (US); Mark Edwin Oesterreich, Roanoke, VA (US); Roy Holmes, Salem, VA (US)

(73) Assignee: Exelis, Inc., McLean, VA (US)

( * ) Notice: Subject to any disclaimer, the term of this patent is extended or adjusted under 35 U.S.C. 154(b) by 1212 days.

(21) Appl. No.: 11/944,951

(22) Filed: Nov. 26, 2007

(65) Prior Publication Data
US 2009/0133178 A1 May 28, 2009

(51) Int. Cl.
*A42B 3/00* (2006.01)
(52) U.S. Cl. ............................................................ 2/6.2
(58) Field of Classification Search ................ 2/422, 6.6, 2/6.2, 6.3, 6.7; 224/181; 359/409, 815, 632
See application file for complete search history.

(56) References Cited

U.S. PATENT DOCUMENTS

| | | | |
|---|---|---|---|
| 4,907,296 A * | 3/1990 | Blecha ................................. | 2/6.2 |
| 5,176,342 A | 1/1993 | Schmidt et al. | |
| 5,331,684 A | 7/1994 | Baril et al. | |
| 5,367,402 A | 11/1994 | Holmes et al. | |
| 5,467,479 A * | 11/1995 | Mattes ................................. | 2/6.3 |
| 5,471,678 A | 12/1995 | Dor | |
| 5,506,730 A | 4/1996 | Morley et al. | |
| 5,542,627 A | 8/1996 | Crenshaw et al. | |
| 5,914,816 A | 6/1999 | Soto et al. | |
| 6,081,094 A | 6/2000 | Crenshaw et al. | |
| 6,457,179 B1 | 10/2002 | Prendergast | |
| 6,472,776 B1 | 10/2002 | Soto et al. | |
| 6,662,370 B1 | 12/2003 | Buchanan, Jr. | |
| 6,751,810 B1 | 6/2004 | Prendergast | |
| 6,862,748 B2 | 3/2005 | Prendergast | |
| 6,938,276 B1 | 9/2005 | Prendergast | |
| 6,957,449 B2 | 10/2005 | Prendergast | |
| 7,885,001 B2 * | 2/2011 | Greer et al. ................... | 359/409 |
| 2009/0137148 A1 | 5/2009 | Neff et al. | |

* cited by examiner

*Primary Examiner* — Shaun R Hurley
*Assistant Examiner* — Andrew Sutton
(74) *Attorney, Agent, or Firm* — RatnerPrestia (57) ABSTRACT

A helmet mount for night vision apparatus including a night vision goggle rotatable between operative and inoperative positions. Retractable stop means are included on the mount for obstructing the rotation of the goggle from its inoperative to operative position without obstructing the rotation of the goggle from its operative to its inoperative position.

8 Claims, 6 Drawing Sheets

NIGHT VISION GOGGLE MOUNT WITH RETRACTABLE STOPS

STATEMENT REGARDING FEDERALLY SPONSORED RESEARCH

This invention was made under U.S. Government Contract No. PAN/05/0201/06 and the United States Government may have certain rights in this invention.

FIELD OF THE INVENTION

This invention relates to an arrangement for coupling night vision goggles to a power pack, and more particularly, to such an arrangement that retains the goggles with its associated power pack when the aviator is ejected from his aircraft.

BACKGROUND OF THE INVENTION

Night vision apparatus is commonly used by aviators to enhance their visibility while flying during night or other low light conditions. Conventional night vision apparatus comprises a night vision goggle including image intensifier tubes, lens assemblies and a complex mounting assembly that provides for numerous adjustments of the goggle position with respect to the user. All of these items combine to provide a relatively heavy device. Such apparatus also includes a relatively light weight power pack that houses a battery or batteries and a circuit board. The power pack is mechanically and electrically coupled to the goggle for operating the goggle and the power pack is, in turn, coupled to the aviators' helmet. As a consequence, the entire weight of the night vision apparatus is supported by the aviator's neck.

When a pilot ejects from an aircraft, the cockpit canopy is ejected from the aircraft and then the aviator is ejected. The acceleration of the aircraft, wind entering the cockpit, the inclination of the aircraft and the large acceleration forces developed as the pilot is suddenly ejected from the aircraft, acting alone or in combination, provide a significant risk that the pilot will be injured.

Because of the heavy weight of the night vision apparatus and because it is supported by the aviator's neck, there is a considerable risk that the apparatus will cause severe neck injuries to the aviator during the ejection.

To reduce this risk of neck injury there are known arrangements that release the night vision goggles from the aviator's helmet as the aviator is subjected to severe acceleration forces during the ejection process. In the known arrangements, however, the relatively light weight power pack does not release. Thus, with the power pack fixed to the helmet, it, the power pack, has the potential to become entangled with the parachute risers during ejection. If the power pack becomes so entangled, it can interfere with the proper opening of the parachute providing additional risk to the aviator.

Accordingly, it is desirable to have a mounting arrangement for night vision apparatus wherein both the goggle and the power pack are automatically released from the aviator's helmet as soon as possible during the ejection process.

SUMMARY OF THE INVENTION

This invention provides a helmet mount for night vision apparatus that automatically releases the apparatus from an aviator's helmet when an ejection is initiated. The night vision apparatus comprises a night vision goggle intensifying low level light into a visible image, a power pack providing electric power operating the goggle and a receptacle and a goggle mount rotatably mounted on said receptacle for rotation between operative and inoperative positions of the goggle. A stop arrangement includes a spring loaded head biased toward a first position in the path of rotation of said goggle mount. The head includes a first surface that obstructs the rotation of the goggle mount from the inoperative to operative position of the goggles. The head further includes a second surface that cooperates with the goggle mount to push said head to a second position that permits the rotation of the goggle mount between the goggles operative and inoperative positions.

BRIEF DESCRIPTION OF THE DRAWINGS

For a better understanding of the invention, reference is made to the following description of an exemplary embodiment thereof, considered in conjunction with the accompanying drawings, in which.

DETAILED DESCRIPTION OF THE INVENTION

Figure 1:
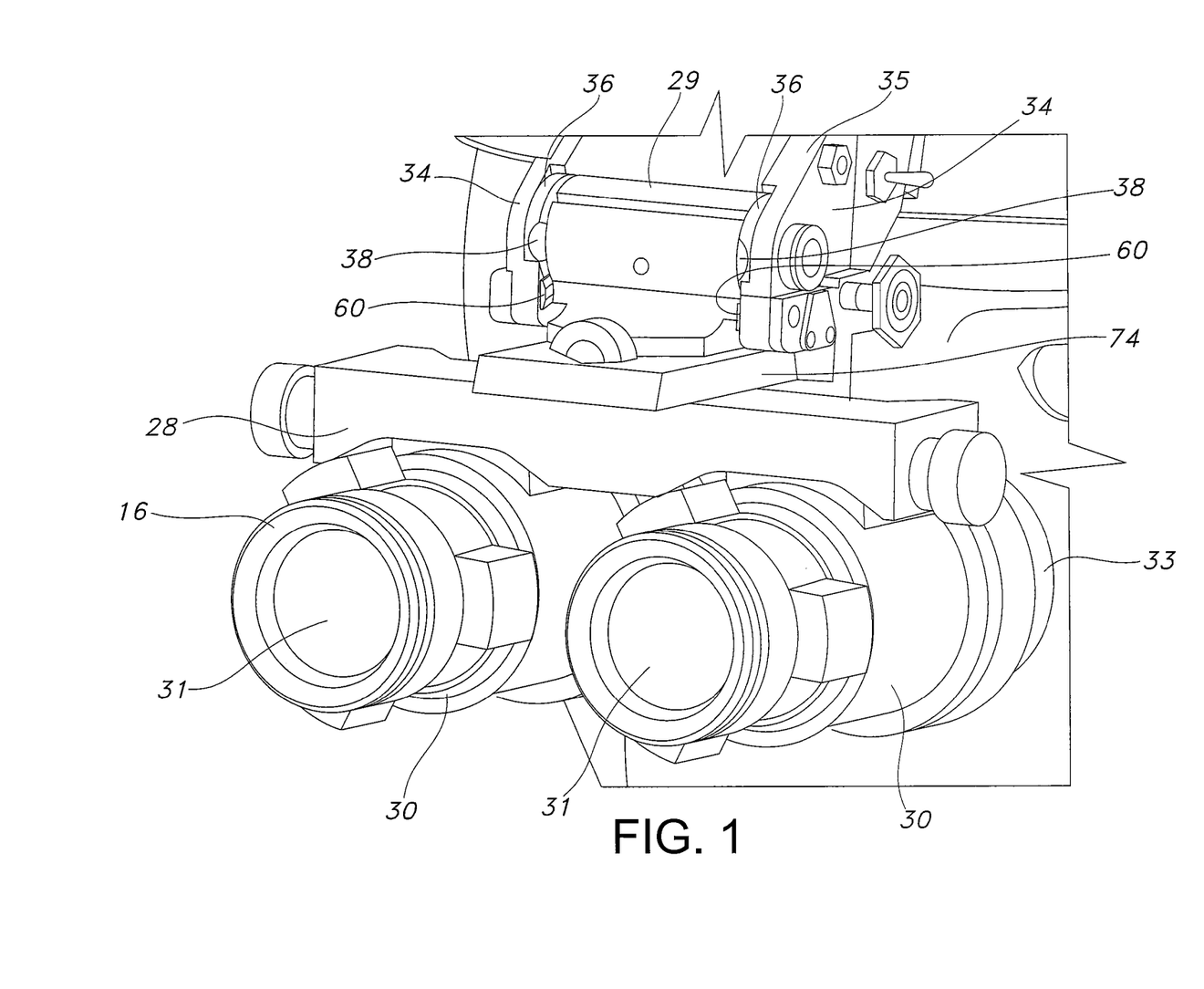
FIG. 1 is a perspective view illustrating a portion of night vision apparatus in accordance with the invention with the goggle shown in its operative position.
Figure 2:
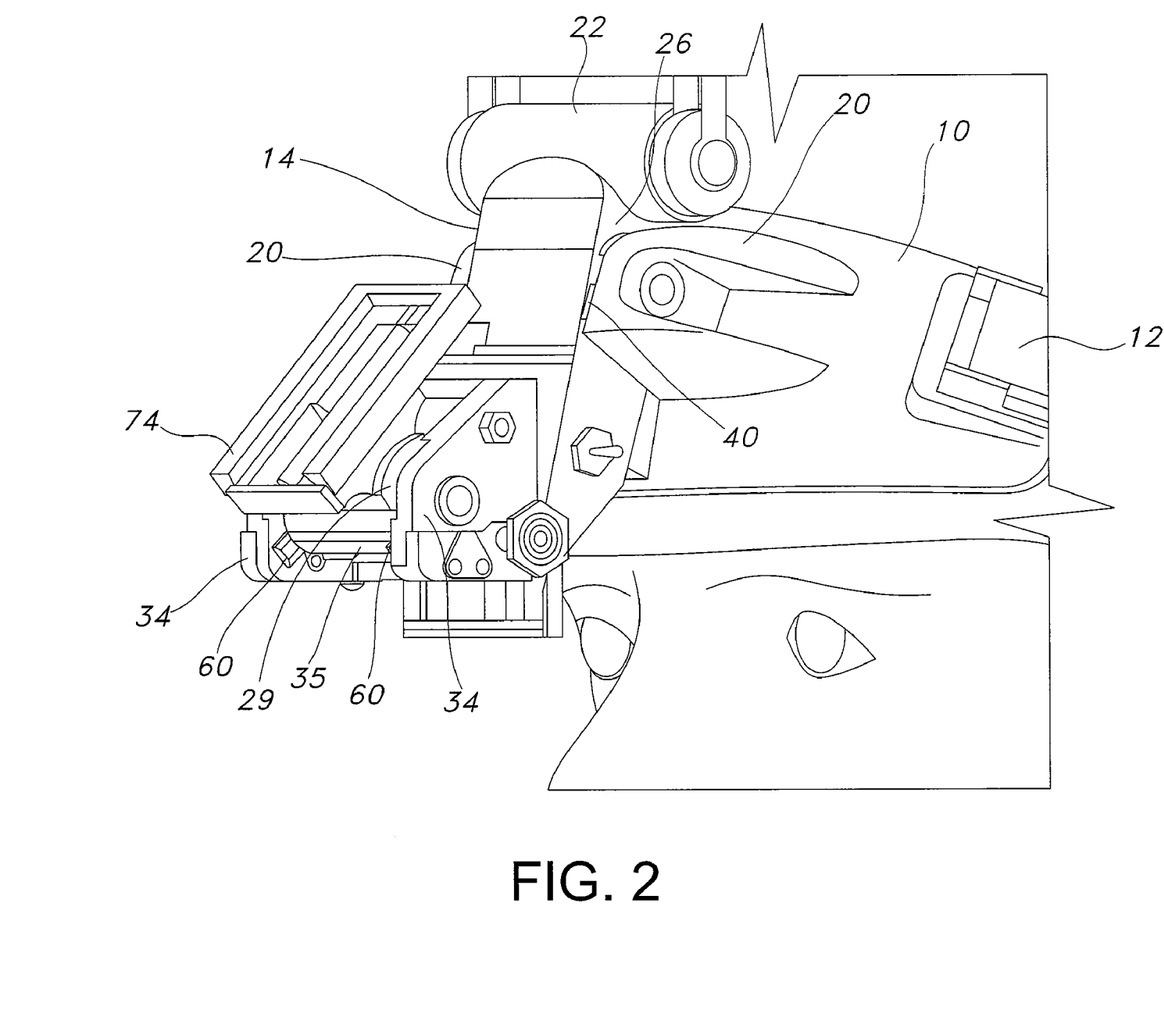
FIG. 2 is also a perspective view of night vision apparatus shown in FIG. 1 with the goggle omitted for the sake of clarity and showing the goggle mount in the inoperative position of the goggle.

Referring to FIGS. 1 and 2 there is shown an exemplary embodiment of a night vision apparatus usable with a retractable stop arrangement in accordance with this invention. There is shown a support band 10 made of plastic or other suitable material. The support band 10 has an inner surface configured to seat on the front surface of a helmet. Also shown is one of a pair of mechanical fastener assembly components 12 used to secure the band to an aviator's helmet. Such fastener assemblies are well known in the art. As illustrated in FIG. 2, the component 12 functions as an over the center clamp that cooperates with sockets on the helmet to fix the support band 10 to the aviator's helmet. It is understood that the fastener assembly could be a screw arrangement or a harness arrangement or any other suitable arrangement.

Still referring to FIGS. 1 and 2, there is also shown a power pack 14 which, as will be made clear hereinafter, is releasably coupled to the support band 10 and a night vision goggle 16 which is releasably coupled to the power pack so that the power pack can be coupled and uncoupled to the support band and the goggle can be coupled and uncoupled to the power pack without the use of tools. The goggle 16 and the power pack 14 are electrically connected so that the power pack operates the goggle. As will also be made clear hereinafter, the releasable couplings between the power pack 14 and the support band 10 and between the power pack and the goggle 16 are configured so that the power pack and the goggles are released simultaneously, preferably as a unit, from the aviator's helmet when a predetermined g-force acts on the aviator.

The power pack 14 includes a battery compartment 22 preferably molded from plastic or other suitable material. The battery compartment 22 is sized and shaped to receive a standard alkaline double AA battery or an L9 lithium battery or other usable battery. Alternatively, the battery compartment may be configured to receive two or more batteries. As is usual, the battery compartment 22 includes battery contacts and electric leads to connect the battery to a printed circuit board which also includes the necessary electric leads and contacts for electrically coupling the printed circuit board to the goggle 16. To accommodate the circuit board, its leads and contacts, the power pack 14 further includes a second compartment also molded from plastic or other suitable material and formed by a front wall 24, a pair of side walls 26 (only one of which is shown) and a back wall (not shown). This second compartment includes a support arrangement to mount the printed circuit board as well as leads and contacts that connect from the battery to the printed circuit board and from the circuit board to the goggle 16.

The night vision goggle 16 can be any such device that receives low level light and intensifies that light to present a viewable image to its user. In the exemplary embodiment shown here, the goggle 16 includes a pair of monoculars 30, 30 of any conventional type. In the alternative a single monocular can be used. Each of the monoculars 30 includes an objective lens 31 that receives low level ambient light and each includes an image intensification tube that intensifies the light and presents a visible images to an eye piece 33 at the end of the monocular opposite the objective lens.

The goggle 16 is carried by a goggle mount assembly that provides for adjustment of the goggle relative to the aviator. Useable mount assemblies are well known in the art and usually include complex adjustment mechanisms for adjusting the goggle's horizontal distance relative to the aviator as well as its tilt and focus, and the interpupillary distance between the monoculars.

The goggle mount assembly and thus the goggle 16 are coupled to the power pack 14 via a mounting receptacle 35. The receptacle 35 is formed with a pair of spaced apart ears 34, 34 which are generally parallel to the side walls 26, 26 of the second battery compartment. Each ear 34 contains a socket member 36 on its inner surface, that is, the surface that faces the adjacent surface of the other ear. In the exemplary embodiment disclosed herein, each socket member 36 includes a generally spherical depression (not shown) that functions as a socket, but the socket could be in the form of a through hole, a bore-counter-bore configuration or a variety of other configurations known in the art.

The goggle mount assembly includes a housing portion 29 which carries a spring loaded plunger arrangement including a compression spring biasing a pair of plungers outwardly of the end walls of the housing. These plungers (not shown) can be balls or are otherwise formed with spherical end surfaces that are inserted into the sockets formed on the socket members 36, 36 to retain the adjustable mount assembly and binocular 16 on the receptacle 35. The plunger and socket arrangement are known and can be of the type disclosed in application (U.S. Ser. No. 11/944,942, filed Nov. 26, 2007) entitled Helmet Mount For Night Vision Goggles filed concurrently herewith by Raymond Aguero et al. and assigned to the assignee of this application or as disclosed in application (U.S. Pat. No. 7,722,279, issued May 25, 2010) entitled Universal Insert filed concurrently herewith by Raymond Aguero et al. and assigned to the assignee of this application. The disclosure of these two applications are incorporated herein by reference.

The goggle mount assembly also includes a shelf 28 that carries the goggle 16 and a base 74 that extends from the compartment 29 to the shelf 28. The base 74 is fixed to the shelf 28.

The mounting assembly is a flip up mount of a type known in the art. Thus, the spherical ends of the spring loaded plungers rotate in the sockets formed on the socket members 36, 36 so that the goggle can be rotated between an operative position as shown in FIG. 1 wherein the goggle 16 is in front of the aviator's eyes and an inoperative position located adjacent the front of the helmet and above the aviator's eyes.

The socket members 36, 36 can be machined or molded into the adjacent surfaces of the ears 34, 34 or the sockets and their below described grooves 38, 38 can be advantageously formed in inserts carried on the ears.

The sockets 36, 36 communicate with the outer edge of the ears 34, 34 via tapered grooves 38, 38. The largest arc length of the tapered grooves is open and is located adjacent the outer edge of the ears 34, 34 and the narrowest arc length is located adjacent the spherical depressions in the sockets 36, 36. The bottom surface of the grooves 38, 38 can be in the form of a ramp that inclines inwardly from the outer edge of the ears 34, 34 to the spherical depressions so that the distance between the grooves decreases as the grooves approach the sockets.

To couple the night vision binoculars to the adjustable mounting assembly, the spring loaded plungers are inserted into the open end of the grooves 38, 38 adjacent the outer edge of the ears 34, 34 and are pushed along the grooves so that the ramped bottom surfaces compresses the plungers until the spring loaded plungers expand into the spherical depressions. When the plungers spring into the spherical depressions, the night vision goggle 16 and its mount assembly are releasably coupled to the mounting receptacle 35. To remove the goggle 16 from the receptacle 35, the goggle is pulled with sufficient force so that the concave wall of the spherical depressions compresses the plungers and the plungers ride along the grooves 38, 38 until the goggle is free of the receptacle.

The outer surface of the support band 10 is formed with a pair of ears 20, 20, which are spaced apart from each other and which extend in the forward direction. Each ear 20, 20 also contains socket members 40, 40 on the surface of the ear that faces the adjacent surface of the other ear. These socket members 40, 40 also include generally spherical depressions and grooves similar to those described above and these depressions and grooves cooperate with spring loaded plungers carried on the power pack 14 to releasably couple the power pack 14 to the support band 10. This plunger and socket arrangement are also disclosed in the two applications incorporated herein.

The socket members 40, 40 can be machined or molded in the ears 20, 20 or these sockets and grooves can be advantageously formed in inserts carried on the ears.

The power pack 14 is coupled to the support band 10 by inserting spring loaded plungers into the socket members 40, 40 (as disclosed in the above incorporated applications) to releasably couple the power pack to the support band 10. Removal of the power pack 14 is accomplished by pulling the power pack in the forward direction until the power pack is free of the support band 10.

In actual use the spring load between the plungers and their associated socket members 40, 40 is such that the power pack 14 and goggles 16 release from the support band 10 at a predetermined g-force, e.g., at least about 9 gs and preferably at about 11 gs.

As noted above, the goggle 16 is relatively heavy and the power pack 14 is relatively light. As a consequence the forces acting during an ejection could rotate the goggle 16 from its inoperative position to its operative position causing the goggle to be released from the power pack 14 before the power pack is released from the support band 10. If the goggle 16 releases from the power pack 14 before the power pack releases from the support band 10, the power pack lacks sufficient weight to assure that it will separate from the support band.

Rotation of the goggle 16 from its inoperative to its operative positions is inhibited by a retractable stop arrangement in accordance with this invention. Such a stop arrangement is illustrated in FIGS. 2-6. An exemplary embodiment of a stop arrangement includes a pair of spring loaded stops 60, 60. One stop 60 is located on one ear 34 and the other stop is located on the other ear. Each stop 60 is located in the path of the goggles rotation between its operative and inoperative positions.

Figure 3:
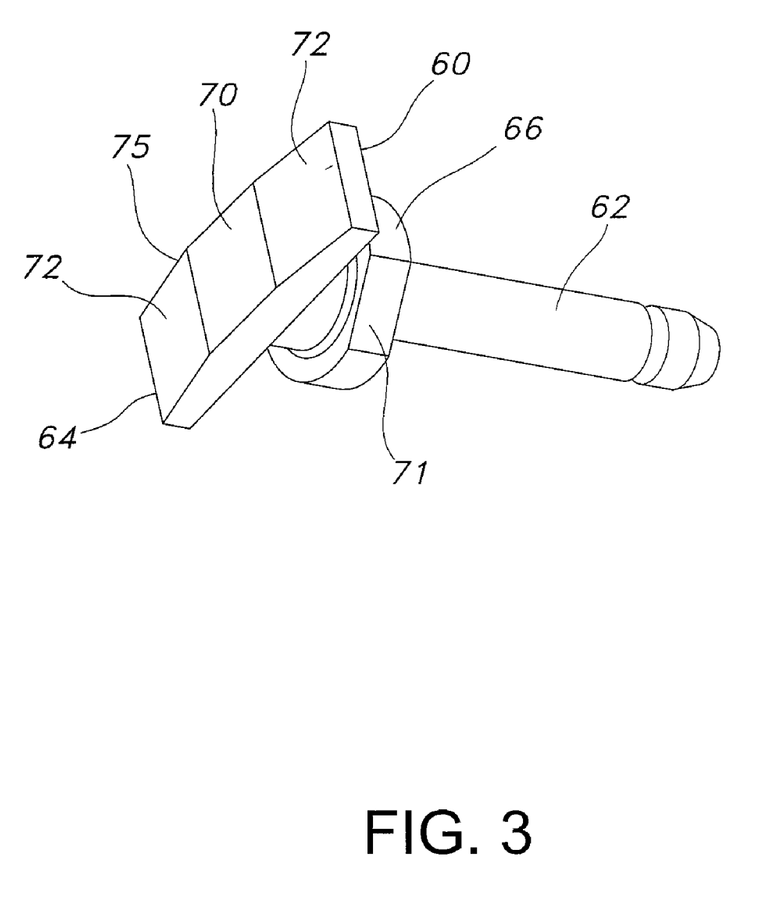
FIG. 3 is a perspective view of the retractable stop illustrated in FIG. 2.
Figure 4:
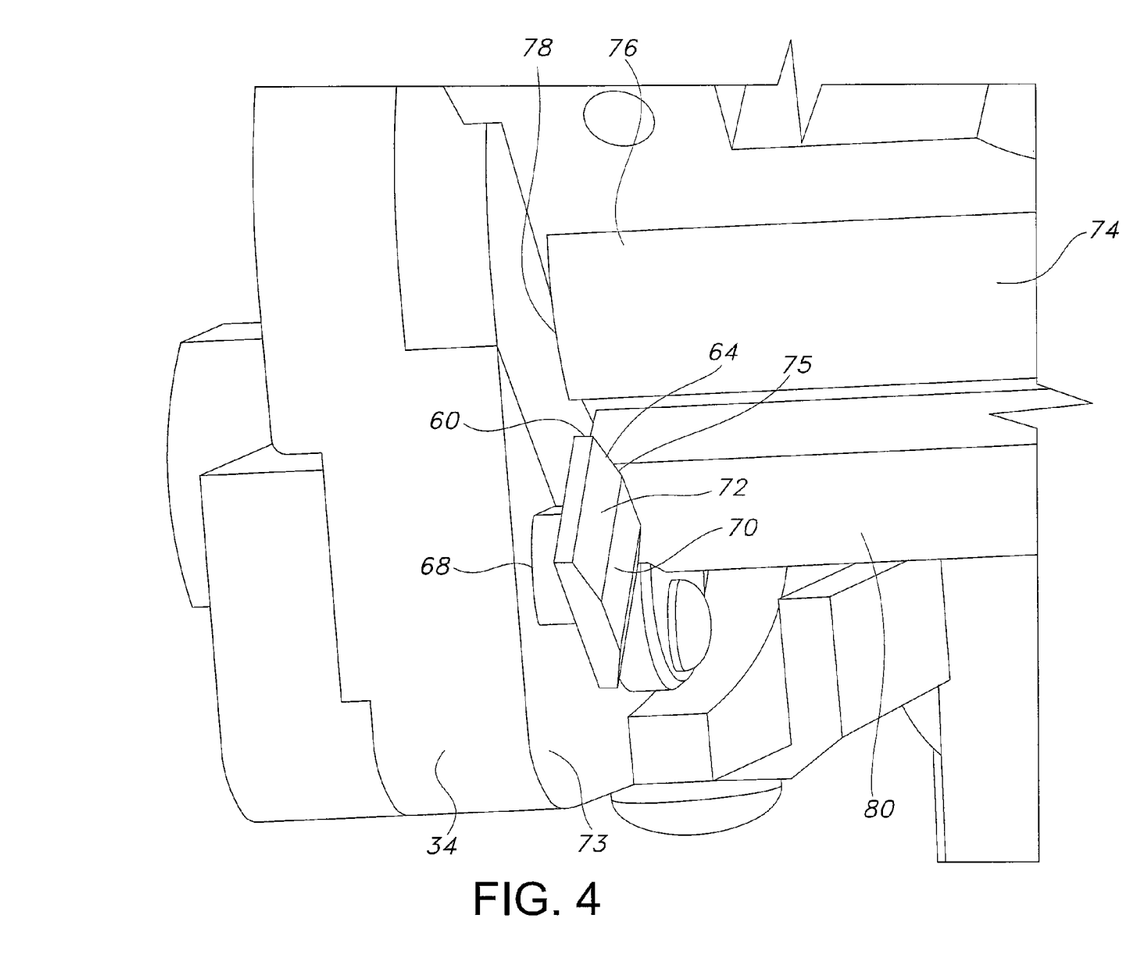
FIG. 4 is a perspective view of a portion of the night vision apparatus shown in FIG. 2 illustrating the retractable stop when the goggle is in its inoperative position.
Figure 5:
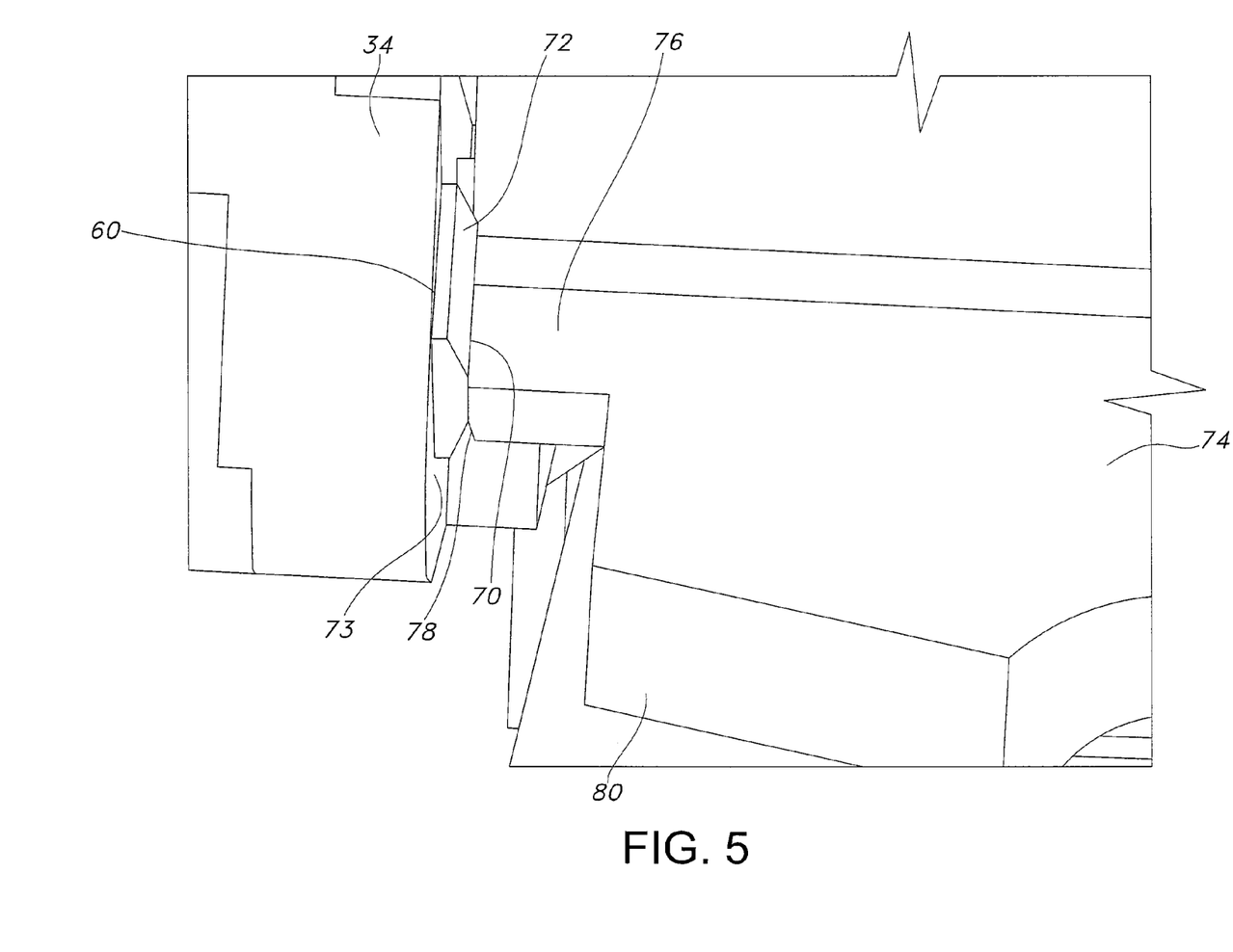
FIG. 5 is a perspective view similar to FIG. 4 illustrating the retractable stop when the goggle is in its operative position.
Figure 6:
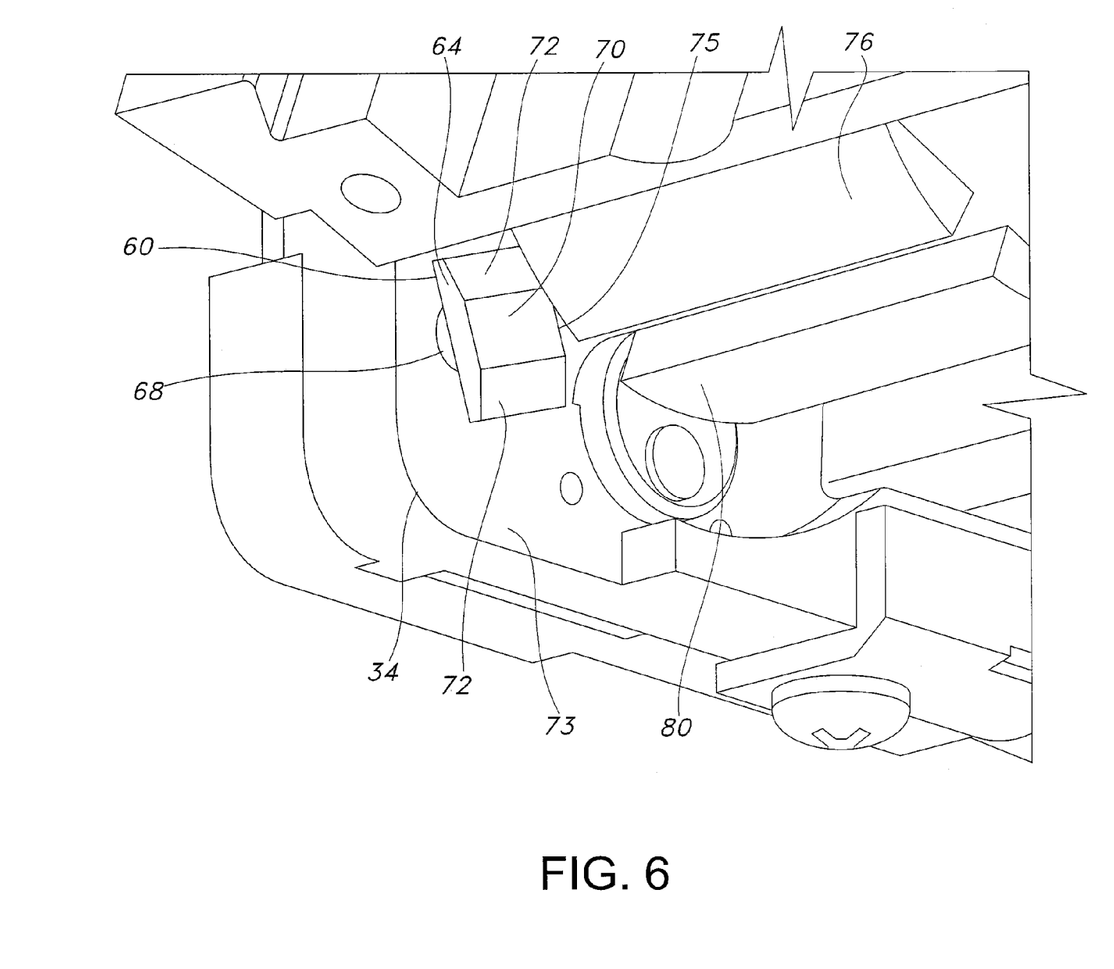
FIG. 6 is a perspective view similar to FIGS. 4 and 5 illustrating the stop as the goggle is rotated between its inoperative to operative position.

Referring to FIG. 3, each stop 60 can be a molded plastic part or machined steel or aluminum or can be made of any other suitable material. It includes a stem 62, a head 64 formed at one end of the stem and a shoulder 66 formed adjacent the head. As shown in FIGS. 4-6 the stem 62 is slideably carried in a bore 68 formed in the ear 34. The bore 68 includes a lip at the surface of the ear 34 so that the shoulder 66 and the lip abut to limit the movement of the stop 60 in the bore. The distance between the head 64 and the shoulder 66 defines the distance that the head 64 can move from the adjacent surface 73 of its associated ear 34.

As seen in FIG. 3, the shoulder 66 is formed with a flat 71 on its outer edge and this flat cooperates with a complementary flat on the surface forming the bore 68. These flats align the stop 60 on the ear so that the head is oriented as needed to cooperate with the goggle and inhibit its rotation from the inoperative to operative positions.

As seen in FIG. 4, the stop 60 is biased to a position wherein the head 64 is spaced from the adjacent surface 73 of its associated ear 34. It should be understood that this is readily accomplished by a compression spring (not shown) coaxially arranged around the stem 62. One end of the spring seats on the bottom surface of the bore 68 and the other end seats on the surface of the shoulder 66 adjacent the free end of the stem 62.

The head 64 is rectangular in plan view and has an outer face formed with a flat surface 70 generally perpendicular to the axis of the stem 62 and generally parallel to the adjacent surface 73 of its associated ear 34. The head 60 also has a pair of inclined surfaces 72, 72 each of which extends from the flat surface 70 at an angle toward the free end of the stem 62 and toward the adjacent surface 73 of its associated ear 34. For reasons to be made clear hereinafter, the inclined surface 72 forms a ramp that inclines from their outer or free edges of the head 64 to the flat surface 70. As seen in FIG. 4, the stops 60, 60 are oriented in their associated ears 34, 34 at an angle to the outer edges of the ear, so that an elongated edge 75 extending across the flat surface 70 and one of the inclined surfaces 72 is in the path of rotation of the goggle mount.

As noted above, the adjustable mount includes a base 74 that extends from the compartment 29 and attaches to a shelf 28 that carries the monoculars 30, 30. As best seen in FIGS. 4-6, the base 74 is formed with a surface 76 of reduced width that extends between the ears 34 and is connected to the compartment 29. The width of surface 76 is such that there is an end surface 78 spaced from surface 73 by about the same distance as the inclined surface 72 is spaced from surface 73. The base 74 also includes another surface 80 that extends across the width of the compartment 29 and this surface 80 has slightly reduced width relative to the surface 76. As seen in FIG. 4, when the goggle 16 is in its inoperative position, the outer face of the surface 80 bears on the elongated edge 75 of the stop 60 to obstruct rotation of the mounting assembly from the inoperative to the operative position.

When it is described to rotate the goggle 16 to its operative position, the goggle is pulled to rotate it whereby the end surface 78 of the surface 76 rides along the inclined surface 72 as shown in FIG. 6 to drive the stop 60 against the spring force to a retracted position wherein the head 64 seats on the surface 73 of the ear 34. When the goggle 16 is in its operative position, the end surface 78 is seated on the flat surface 70 as shown in FIG. 5.

When it is desired to rotate the goggle 16 to its inoperative position, the goggle is pushed upwardly and the end surface 78 rides off of the flat surface 70 and along the inclined surface 72 without impeding that rotation. When the end surface 78 is free of the inclined surface 72, the stop 60 is biased away from the ear and is again operative to obstruct the rotation of the goggle from the inoperative to operative position.

While in the foregoing there has been disclosed an exemplary embodiment of the invention, it should be understood that the scope of the invention is set forth in the appended claims.

What is claimed:

1. A helmet mount for night vision apparatus:
   said apparatus including a night vision goggle intensifying low level light into a visible image, a receptacle, and a mounting arrangement attached to said goggle and releasably coupled to said receptacle, said mounting arrangement being rotatable on said receptacle between operative and inoperative positions of said goggle; and
   a stop arrangement including a spring loaded head biased toward a first position in the path of rotation of said mounting arrangement, said head having a first surface that obstructs rotation of the mounting arrangement from the inoperative to the operative position of said goggle, said head having a second surface that cooperates with said mounting arrangement to push said head to a second position that permits the rotation of said mounting arrangement between the goggles operative and inoperative positions;
   wherein said head is mounted on a surface of said receptacle, said head having a flat surface generally parallel to said surface of said receptacle and said head further having a ramp surface extending from said flat surface toward said surface of said receptacle.

2. A helmet mount in accordance with claim 1 wherein said spring loaded head is located on said receptacle and wherein in its first position said head is spared from said receptacle and in said second position said head seats on said receptacle.

3. A helmet mount in accordance with claim 1 wherein said mounting arrangement includes a first surface that abuts said first surface of said head and further includes a second surface adjacent said first surface that rides on the second surface of said head to push said head to its second position when said goggle is rotated from its inoperative to its operative position.

4. A helmet mount in accordance with claim 1 wherein in the second position, the head does not prevent the rotation of said mounting arrangement from the goggles operative to its inoperative position.

5. A helmet mount for night vision apparatus;
   said apparatus includes a night vision goggle intensifying low level light into a visible image and a goggle mount carrying said goggle, said goggle mount including a pair of coaxial plungers; a receptacle having a pair of surfaces each of which has a socket that cooperates with one of said plungers whereby the mounting arrangement is rotatably mounted to said receptacle for rotating said goggle between its inoperative and operative positions; and a stop arrangement including a pair of spring loaded heads, each of said heads being located on one of said surfaces of said receptacle, each of said heads being biased to a first position spaced from its associated surface and having a first surface that cooperates with a first surface of said goggle mount to obstruct the rotation of said mount from the goggle's inoperative to operative position, each of said heads having a second surface that cooperates with a second surface of said goggle mount to push said head to a second position adjacent its associated surface whereby said first surfaces do not obstruct the rotation of said mount from the goggles inoperative to operative positions;

wherein each of said heads has a flat surface generally parallel to said one of said surfaces of said receptacle and wherein said second surface of said head is an inclined surface extending from said flat surface toward said one of said surfaces of said receptacle.

6. A helmet mount in accordance with claim 5 wherein the second surface of said goggle mount seats on a surface of said head when the goggle is in its operative position and wherein said second surface of said goggle mount rides along said second surface of said head when the goggle mount is rotated from the goggles operative to inoperative positions so that said head moves from its second position to its first position.

7. A helmet mount in accordance with claim 5 wherein said first surface of said head is an edge surface of said head extending adjacent said flat surface.

8. A helmet mount in accordance with claim 3 wherein the second surface of said goggle mount seats on said flat surface of said head to retain said head in its second position when the goggle is in its operative position.

* * * * *